US008215625B2

(12) United States Patent
Wu

(10) Patent No.: US 8,215,625 B2
(45) Date of Patent: Jul. 10, 2012

(54) KEY BLANK SELECTOR

(76) Inventor: Kuo-Shen Wu, Taipei (TW)

( * ) Notice: Subject to any disclaimer, the term of this patent is extended or adjusted under 35 U.S.C. 154(b) by 1048 days.

(21) Appl. No.: 12/216,008

(22) Filed: Jun. 27, 2008

(65) Prior Publication Data

US 2009/0001645 A1 Jan. 1, 2009

(30) Foreign Application Priority Data

Jun. 28, 2007 (TW) ................................ 96210499 U

(51) Int. Cl.
*G01B 3/14* (2006.01)

(52) U.S. Cl. .............. 269/287; 76/110; 33/539; 33/501; 409/85

(58) Field of Classification Search .................. 269/287; 215/11.1; 409/83; *G01B 3/14*
See application file for complete search history.

(56) References Cited

U.S. PATENT DOCUMENTS 1,869,073 A * 7/1932 Miller .......................... 83/466.1
2,707,335 A * 5/1955 Falk ................................ 33/539
2,940,183 A * 6/1960 Fromberg ....................... 33/539
3,172,969 A * 3/1965 Haggstrom ................ 200/61.59
3,774,794 A * 11/1973 Bateman ....................... 215/220
5,127,532 A * 7/1992 Cimino et al. ................ 211/120
5,167,171 A * 12/1992 Heredia .......................... 76/110
5,351,409 A * 10/1994 Heredia .......................... 33/539
5,617,323 A * 4/1997 Stansberry et al. ........... 700/161
2007/0084819 A1* 4/2007 Fialkowski .................. 215/11.1
2009/0001645 A1* 1/2009 Wu ............................... 269/287

* cited by examiner

*Primary Examiner* — Lee D Wilson
*Assistant Examiner* — Jamal Daniel
(74) *Attorney, Agent, or Firm* — Bacon & Thomas, PLLC

(57) ABSTRACT

A key blank selector has a base, a template and a clamp. The base defines a chamber and a platform having a recess communicating with the chamber. The template is soft and pliable corresponds to and is detachably mounted in the recess of the platform. The clamp is detachably mounted around the platform of the base to hold and position the template in the recess and has an opening formed corresponding to the chamber of the base. A mother key is positioned perpendicularly on and force applied to pierce through the template and form a figure corresponding to a cross sectional profile of the mother key in the template; therefore, facilitating key blank selection and preventing misjudgment.

6 Claims, 7 Drawing Sheets

KEY BLANK SELECTOR

BACKGROUND OF THE INVENTION

1. Field of the Invention

The present invention relates to a key blank selecting assistance device, and more particularly to a key blank selector that facilitates key blank selection and is simple in structure.

2. Description of Related Art

Keys are used to actuate and open locks that comprise tumblers corresponding to bittings of the key.

Most users of keys have duplicates made in case keys are lost. Generally, a key duplicate is manufactured following process including: selecting a specific key blank, forming bittings on the key blank according to the mother key, and grinding a ragged edge of the key blank.

Said key blanks are in various types and have different specific cross sectional profiles. With reference to FIGS. 7 to 10, a key blank (80) may a variety of cross sectional profiles (81A) (81B) (81C), to generate more complex combinations and improve security by preventing easy copying. However, this increases difficulty for locksmiths to find a correct key blank, since key blank selection is normally performed solely by the eye. This may lead to misjudgment and incorrect copies to be made, thereby inconveniencing customers and creating material wastage.

The present invention therefore provides a key blank selector to obviate or mitigate the aforementioned problems.

SUMMARY OF THE INVENTION

The main objective of the present invention is to provide a key blank selector that facilitates key blank selection and is simple in structure.

To achieve the objective, the key blank selector comprises a base, a template and a clamp. The base defines a chamber and a platform having a recess communicating with the chamber. The template is soft and pliable, such as zinc, lead alloys thereof or the like, corresponds to and is detachably mounted in the recess of the platform and has a central mark corresponding to the chamber. The clamp is detachably mounted around the platform of the base to position the template in the recess and has an opening formed corresponding to the chamber of the base.

A mother key having a tip thereof positioned on the central mark of the template is driven perpendicularly through the opening of the clamp and the template and pierces through the template to form a figure corresponding to a cross sectional profile of the mother key in the template.

Then, when manufacturing multiple key duplications, correct key blanks can be rapidly and conveniently selected by ensuring the key blank corresponds to the figure in the template and effectively avoiding key blank misjudgment.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
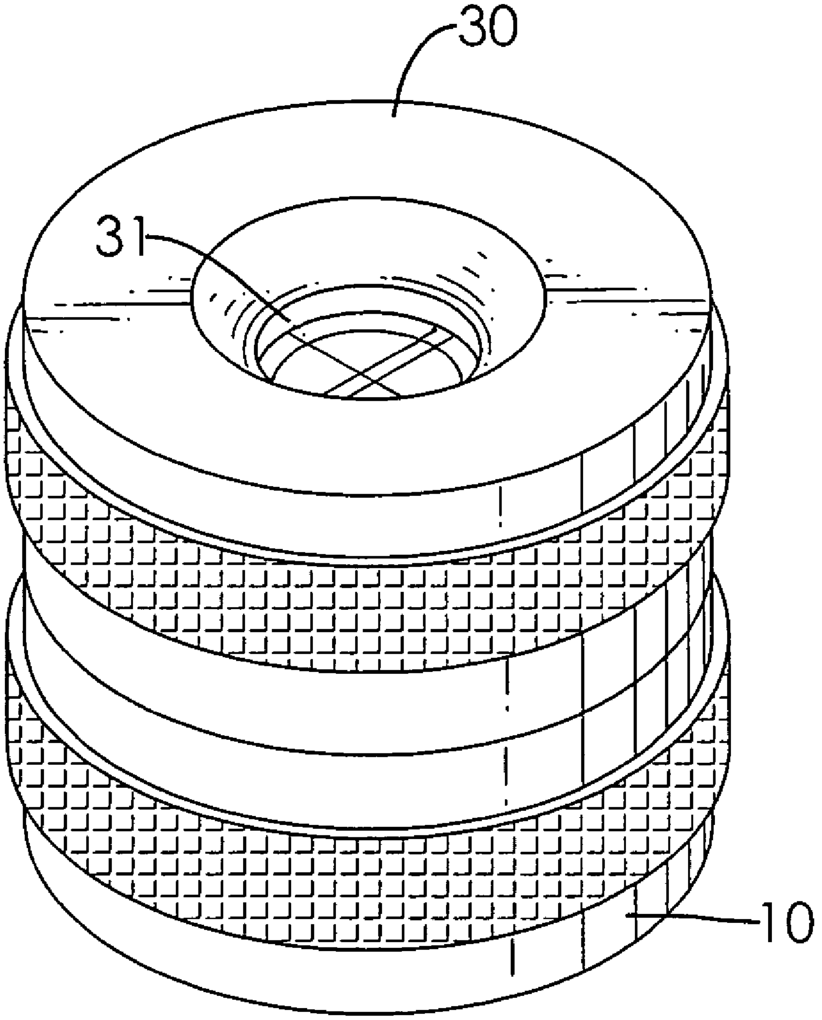
FIG. 1 is a perspective view of a key blank selector in accordance with the present invention.
Figure 3:
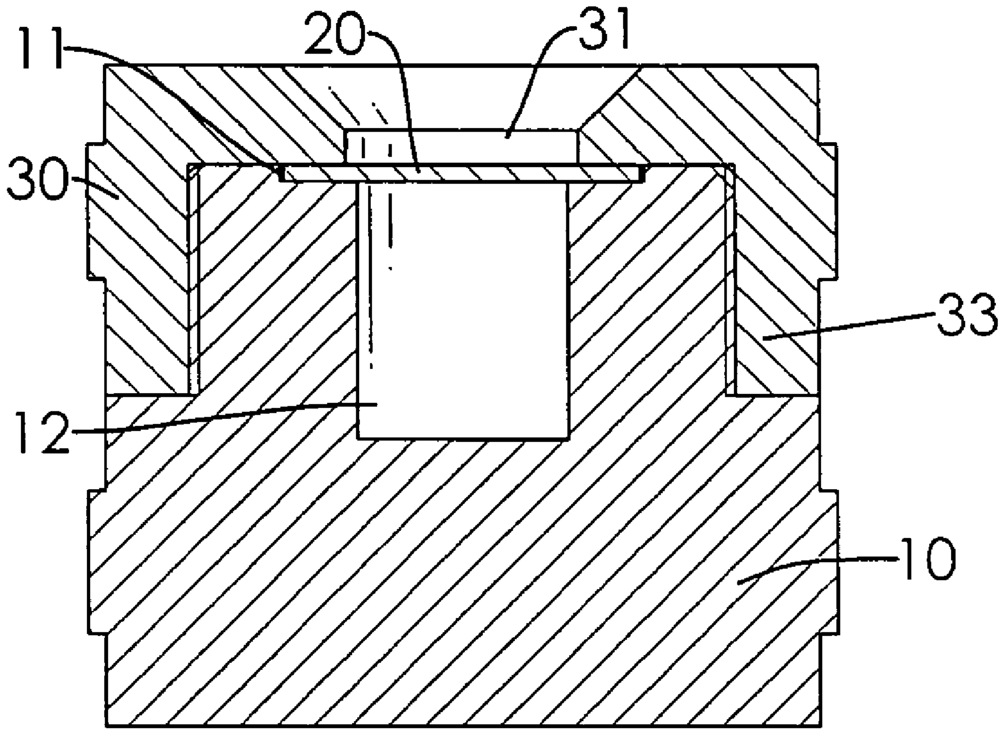
FIG. 3 is a cross sectional side view of the key blank selector in FIG. 1.
Figure 6:
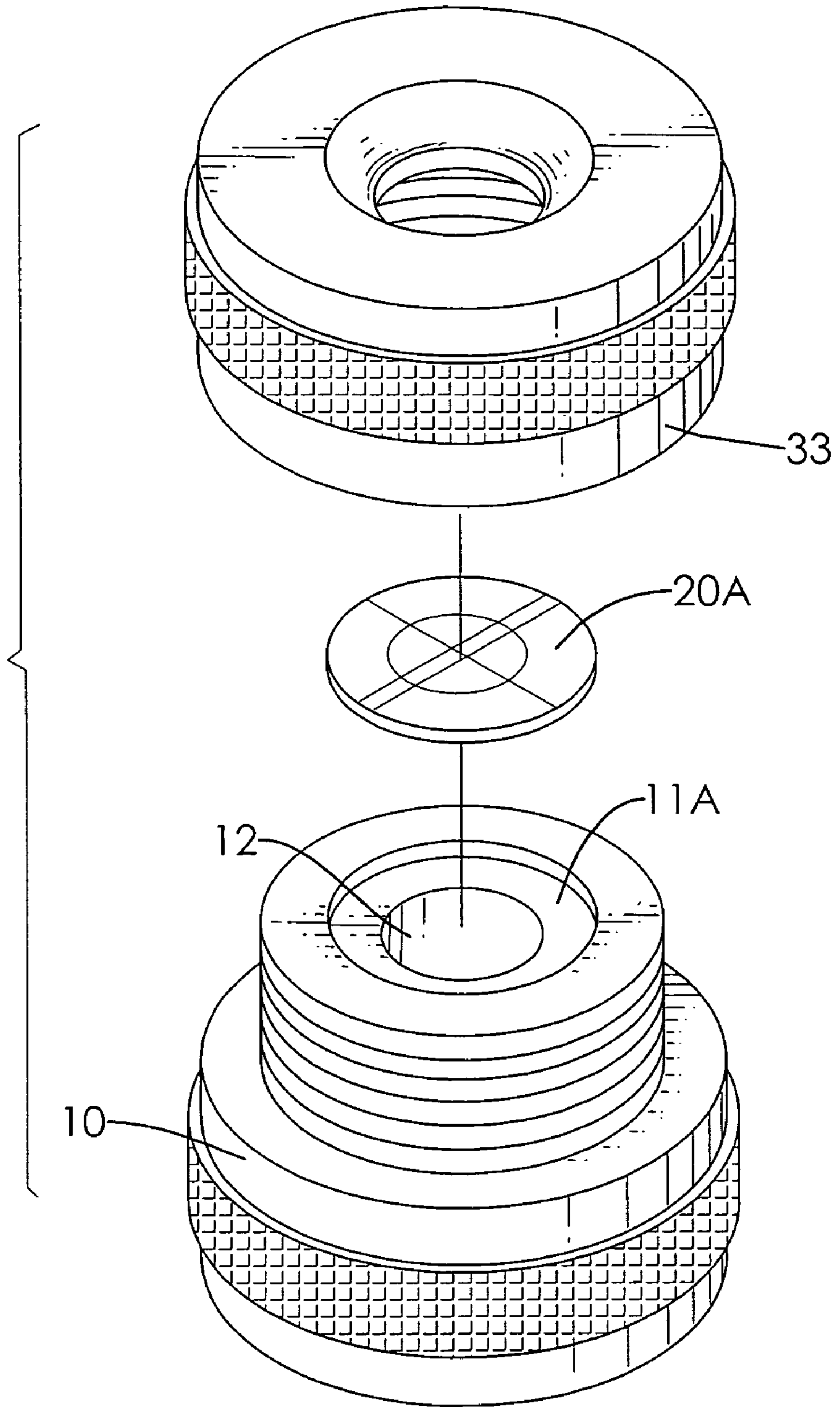
FIG. 6 is an exploded perspective view of another embodiment of the key blank selector in accordance with the present invention.
Figure 7:
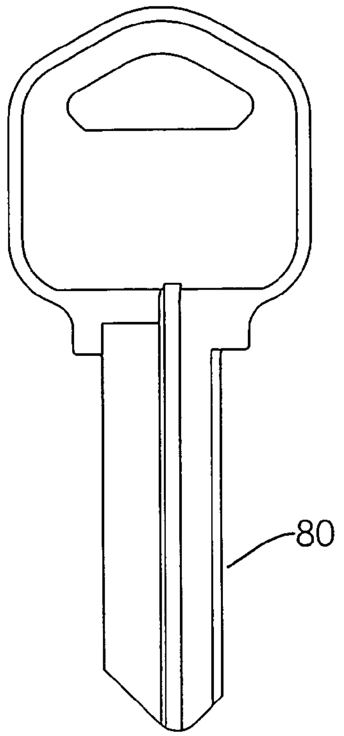
FIG.7 PRIOR ART
FIG. 7 is a front view of a conventional key blank in accordance with prior art.
Figure 8:
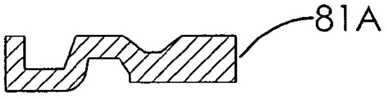
FIG.8 PRIOR ART
FIGS. 8 to 10 are end views of various conventional key blanks in accordance with the prior art.
Figure 9:
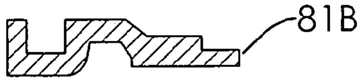
FIG.9 PRIOR ART
Figure 10:
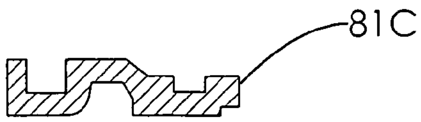
FIG.10 PRIOR ART

With reference to FIGS. 1, 3 and 6, the key blank selector in accordance with present invention comprises a base (10), a template (20)(20A) and a clamp (30).

The base (10) may be substantially cylindrical and has a top, a side surface, a platform (13), a chamber (12), a recess (11)(11A) and an optional grip. The platform (13) protrudes from the top of the base (10) and has a plane surface, a side surface and an optional outer thread (14). The outer thread (14) is formed around the side surface of the platform (13). The chamber (12) is formed through the platform (13) and allows a key blank to be mounted therein. The recess (11) has a shape, is formed in the plane surface of the platform (13) and communicates with the chamber (12) and may be quadrangular, circular, polygonal or the like. Preferably the shape of the recess (11A) is circular or the recess (11) is quadrangular. The grip is formed around the side surface of the base (10) to facilitate holding the base (10).

Figure 2:
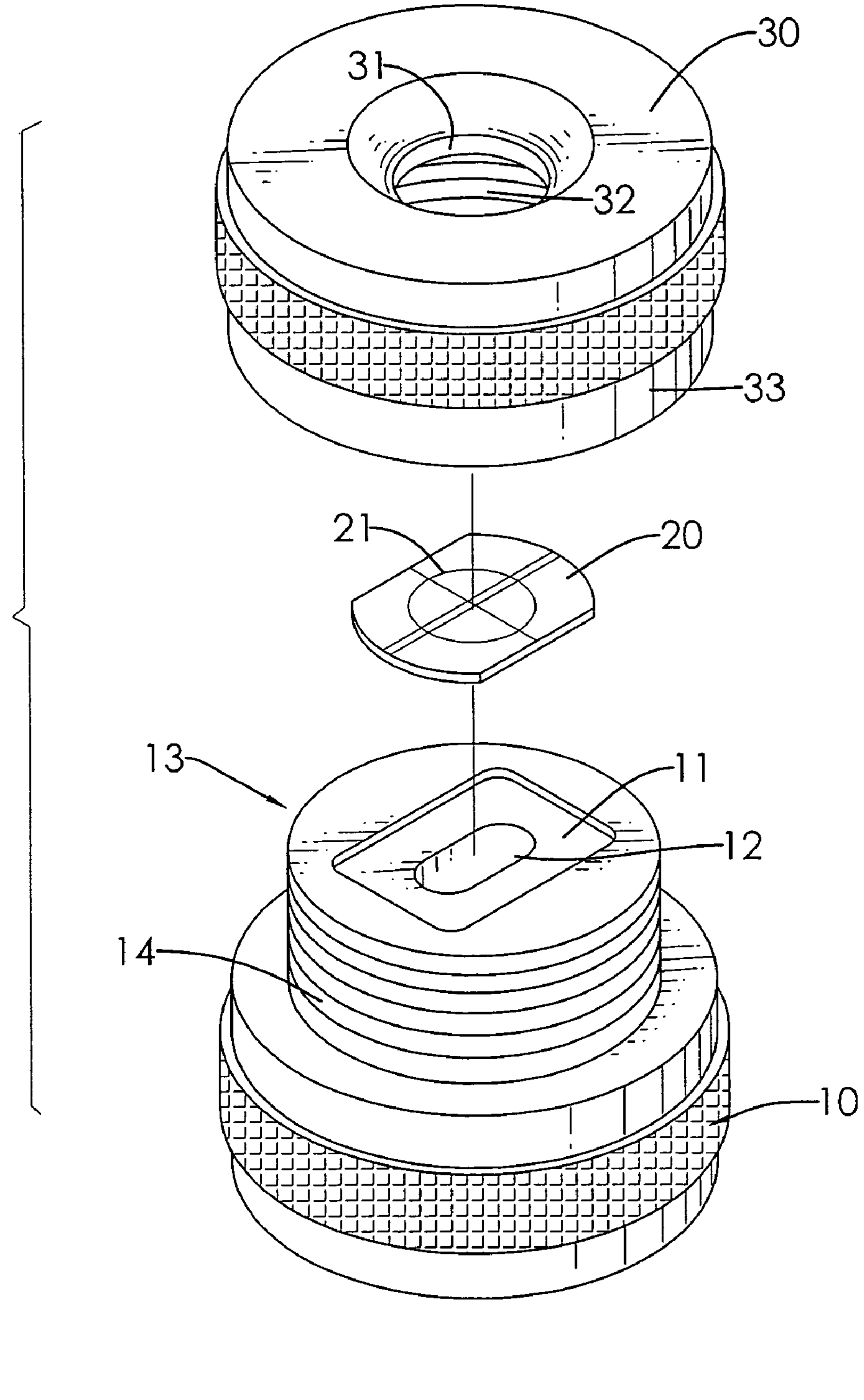
FIG. 2 is an exploded perspective view of the key blank selector in FIG. 1.

The template (20)(20A) is soft and pliable, and may be a metal such as zinc, lead and alloys thereof or the like such as plastics, corresponds to and is detachably mounted in the recess (11)(11A) of the platform (13) and has a central portion and a central mark (21) being formed in the central portion and corresponding to the chamber (12). With further reference to FIG. 2, the template (20) corresponds to and is mounted in the recess (11) may have at least one cutout or hole to facilitate removal and may be circular or quadrangular. The clamp (30) may be substantially cylindrical, is detachably mounted around the platform (13) of the base (10) to hold and position the template (20)(20A) securely in the recess (11)(11A) and has a side wall (33), an opening (31) and an optional grip and an optional inner thread (32). The side wall (33) is formed around the clamp (30) corresponds to and is mounted detachably on the platform (13) of the base (10) and has an outer surface and an inner surface. The opening (31) is formed through the clamp (30), corresponds to the chamber (12) of the base (10) and is smaller than the template (20)(20A) to allow the central portion of the template (20)(20A) to be revealed. The grip is formed around the outer surface of the side wall (33) of the clamp (30) to facilitate holding and removal. The inner thread (32) is formed around the inner surface of the side wall (33) and selectively engages the outer thread (14) of the platform (13) to detachably mount the clamp (30) securely on the platform (13).

Figure 4:
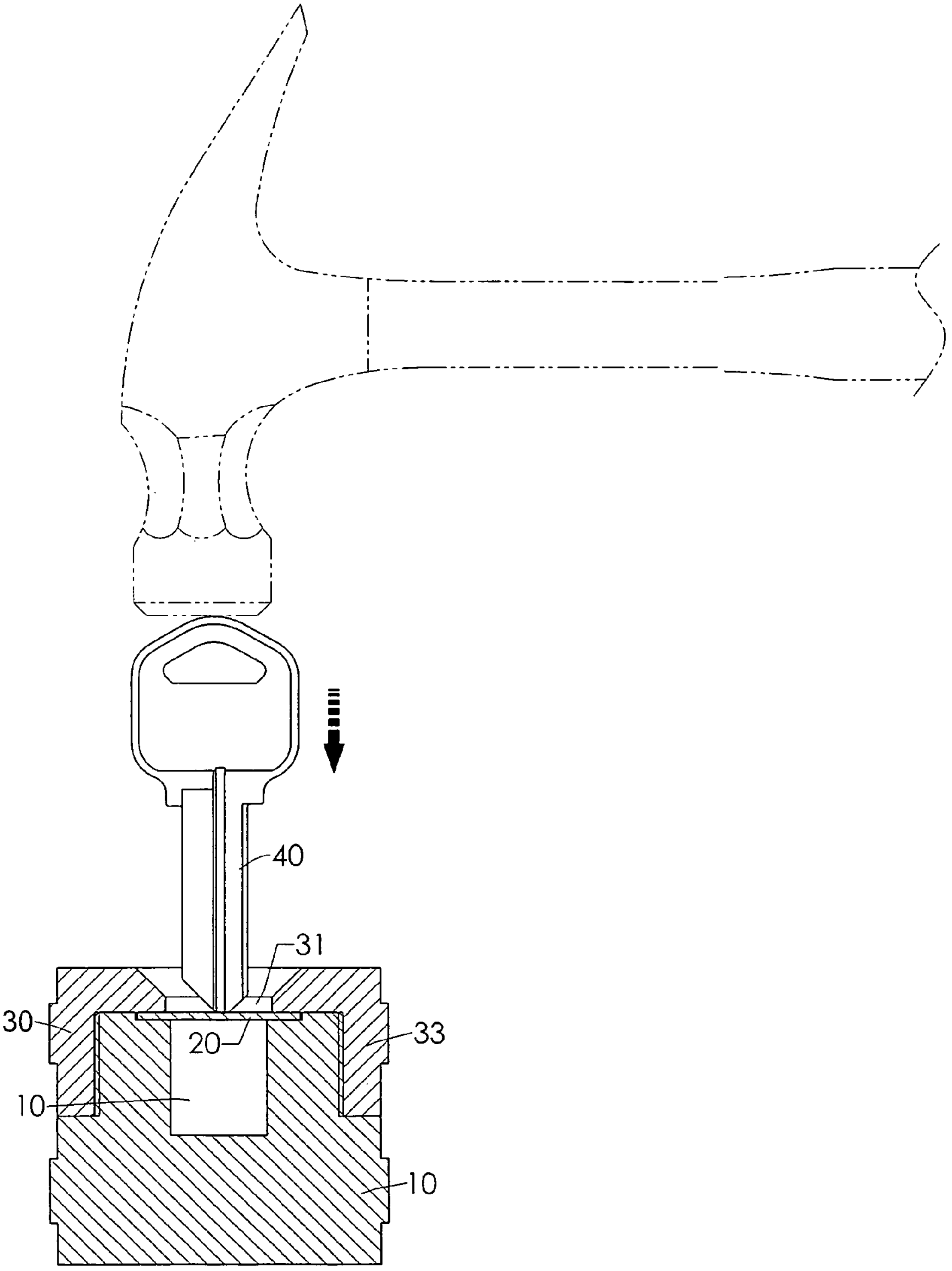
FIG. 4 is an operational side view in partial section of the key blank selector in FIG. 1.
Figure 5:
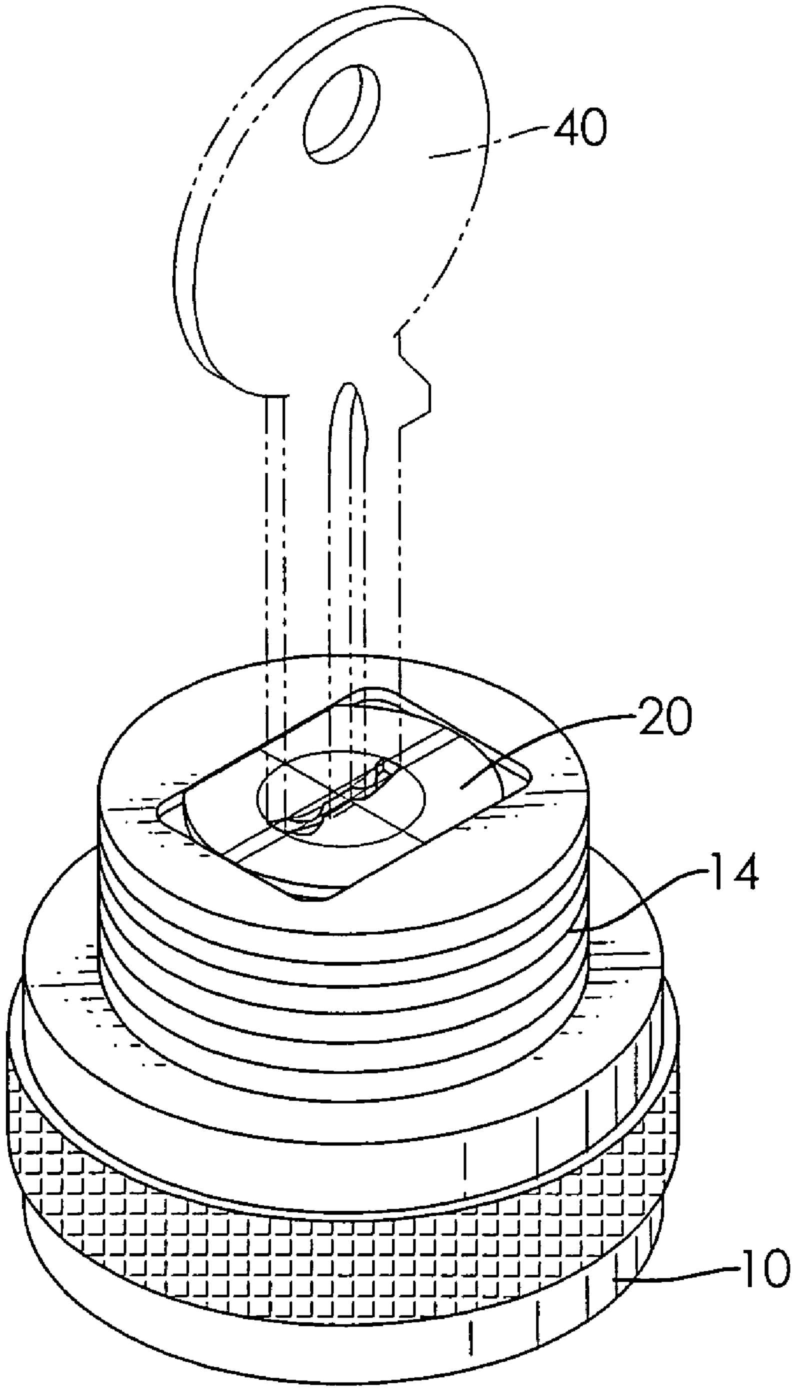
FIG. 5 is an operational perspective view of the key blank selector in FIG. 1.

A mother key (40) has a tip and is perpendicularly positioned on the template (20)(20A) through the opening (31) of the clamp (30) with the tip corresponding to the central mark (21) of the template (20)(20A). With further reference to FIGS. 4 and 5, a tool such as a hammer forces the mother key (40) to pierce through the template (20)(20A) and form a figure corresponding to a cross sectional profile of the mother key (40) in the template (20)(20A).

Then, when manufacturing multiple key duplicates, correct key banks can be rapidly and conveniently selected by trial and error of the key blank through the figure in the template (20)(20A) and effectively avoid key blank misjudgment.

Even though numerous characteristics and advantages of the present invention have been set forth in the foregoing description together with details of the structure and function of the invention, the disclosure is illustrative only. Changes may be made in detail especially in matters of shape, size, and arrangement of parts within the principles of the invention to the full extent indicated by the broad general meaning of the terms in which the appended claims are expressed.

What is claimed is:

1. A key blank selector comprising
a base being cylindrical and having
a top;
a side surface
a platform protruding from the top of the base and having
a plane surface;
a side surface; and
an outer thread formed around the side surface of the platform;
a chamber being formed through the platform;
a recess having a shape, being formed in the plane surface of the platform and communicating with the chamber; and
a grip being formed around the side surface of the base;
a template being soft and pliable, being made of lead and corresponding to and being detachably mounted in the recess of the platform and having
a central portion; and
a central mark being formed in the central portion and corresponding to the chamber; and
a clamp being cylindrical, being detachably mounted around the platform of the base and having
a side wall being formed around the clamp corresponding to and being mounted detachably on the platform of the base and having
an inner surface;
an inner thread being formed around the inner surface of the side wall to selectively engage the outer thread on the platform; and
an outer surface; and
an opening being formed through the clamp, corresponding to the chamber of the base and being smaller than the template, thereby allowing the central portion of the template to be revealed; and
a grip being formed around the outer surface of the side wall of the clamp.

2. The key blank selector as claimed in claim 1, wherein the shape of the recess of the platform is circular and the template is circular.

3. The key blank selector as claimed in claim 1, wherein the recess of the platform is quadrangular and the template is quadrangular.

4. A key blank selector comprising:
a base being cylindrical and having
a top;
a side surface;
a platform protruding from the top of the base and having
a plane surface;
a side surface; and
an outer thread formed around the side surface of the platform;
a chamber being formed through the platform;
a recess having a shape, being formed in the plane surface of the platform and communicating with the chamber; and
a grip being formed around the side surface of the base;
a template being soft and pliable, being made of zinc and corresponding to and being detachably mounted in the recess of the platform and having
a central portion; and
a central mark being formed in the central portion and corresponding to the chamber; and
a clamp being cylindrical, being detachably mounted around the platform of the base and having
a side wall being formed around the clamp corresponding to and being mounted detachably on the platform of the base and having
an inner surface;
an inner thread being formed around the inner surface of the side wall to selectively engage the outer thread on the platform; and
an outer surface; and
an opening being formed through the clamp, corresponding to the chamber of the base and being smaller than the template, thereby allowing the central portion of the template to be revealed; and
a grip being formed around the outer surface of the side wall of the clamp.

5. The key blank selector as claimed in claim 4, wherein the shape of the recess of the platform is circular and the template is circular.

6. The key blank selector as claimed in claim 4, wherein the recess of the platform is quadrangular and the template is quadrangular.

* * * * *